United States Patent
Narasimha

(10) Patent No.: US 10,037,550 B2
(45) Date of Patent: Jul. 31, 2018

(54) SYSTEM AND METHOD FOR IDENTIFYING OFFLINE CONSUMER INTERESTS FOR ONLINE PERSONALIZATION BY LEVERAGING MULTIMEDIA INPUTS

(71) Applicant: TELIBRAHMA CONVERGENT COMMUNICATIONS PRIVATE LIMITED, Bangalore (IN)

(72) Inventor: Suresh Narasimha, Bangalore (IN)

(73) Assignee: TELIBRAHMA CONVERGENT COMMUNICATIONS PRIVATE LIMITED, Karnataka (IN)

( * ) Notice: Subject to any disclaimer, the term of this patent is extended or adjusted under 35 U.S.C. 154(b) by 474 days.

(21) Appl. No.: 14/271,513

(22) Filed: May 7, 2014

(65) Prior Publication Data

US 2014/0337260 A1   Nov. 13, 2014

(51) Int. Cl.
*G06N 5/04* (2006.01)
*G06Q 30/02* (2012.01)

(52) U.S. Cl.
CPC .......... *G06Q 30/0269* (2013.01); *G06N 5/04* (2013.01); *G06Q 30/0201* (2013.01)

(58) Field of Classification Search
CPC ........................................................ G06N 5/04
USPC ........................................................... 706/45
See application file for complete search history.

(56) References Cited

U.S. PATENT DOCUMENTS

2005/0197858 A1* 9/2005 Lindsey ................ A61B 6/00
 705/2
2010/0100551 A1* 4/2010 Knauft .............. G06F 17/30616
 707/741

OTHER PUBLICATIONS

Nicu Sebe and Qi Tian, "Personalized Multimedia Retrieval: The New Trend?", MIR '07 Proceedings of the international workshop on Workshop on multimedia information retrieval, Sep. 28, 2007, Augsburg, Bavaria, DE, copyright ACM, 2007, pp. 299-306.*
Christian Manniche, "ContextTag—Context-aware Media Annotation Utilizing Social Networks", Master's Thesis, published by Kongens Lyngby 2010 IMM-M.Sc-2010-34, DTU Informatics, Technical University of Denmark, Jun. 2010, pp. 1-82.*
Erez Shmueli, Ronen Waisenberg, Yuval Elovici, and Ehud Gudes, "Designing secure indexes for encrypted databases", Proceeding DBSec'05 Proceedings of the 19th annual IFIP WG 11.3 working conference on Data and Applications Security, copyright Springer-Verlag, 2005, pp. 54-68.*

* cited by examiner

*Primary Examiner* — Lut Wong

(74) *Attorney, Agent, or Firm* — Barry Choobin; Patent 360 LLC

(57) ABSTRACT

A system, method and computer implemented program product for enabling a user to retrieve information from a telecommunication network. The system, in accordance with the present invention comprises a handheld device, using which multimedia inputs, typically photographs of objects of interest could be captured. Subsequently, the images are processed by a processor and relevant keywords describing the image are extracted. A search is carried out for information comprising the extracted keywords, and the retrieved information is shared with the user, via the handheld device. A third party service provider or an online merchant portal or establishment provides an updated detail to the user based on retrieved updated user profile comprising the updated user preferences and interests.

8 Claims, 2 Drawing Sheets

SYSTEM AND METHOD FOR IDENTIFYING OFFLINE CONSUMER INTERESTS FOR ONLINE PERSONALIZATION BY LEVERAGING MULTIMEDIA INPUTS

CROSS-REFERENCE TO RELATED APPLICATION

The present application claims the priority of an Indian Provisional Patent Application with serial number 1644/CHE/2013 filed on Apr. 11, 2013 and post dated to May 11, 2013 with the title, "Method and System for Rendering Personalized Information to A User Device Based on A Multimedia Input", the contents of which is incorporated in its entirety herein at least by reference.

BACKGROUND

Technical Field

The embodiments herein generally are related to the field of information systems. Particularly, the embodiments herein are related to the field of information retrieval based on content processing. More particularly, the embodiments herein are related to the systems and methods for processing multimedia content to understand consumer preferences and enable external services and third party service providers to deliver personalized or customized information to users based on the processed multimedia inputs.

Description of the Related Art

People, as a part of their daily routine come across a multitude of objects, out of which certain objects might invoke an interest in certain people, thereby prompting them to search for further information about the object(s) of interest.

One of the popular ways of obtaining information about an object of interest is to search the World Wide Web for information about the object(s) of interest. However, searching the World Wide Web, solely depending solely upon the mental recollection of the attributes of the objects of interest may not yield expected results, if the description of the object provided by the searcher does not match the information available on the World Wide Web. Further, the World Wide Web may yield inaccurate results, if the searcher fails to provide an accurate description of the object under consideration. Moreover, World Wide Web comprises voluminous information about multitude of objects, and searching for the right object and obtaining the appropriate information will always remain a challenge for a novice user. Moreover, World Wide Web is typically prone to the phenomenon of information overloading, wherein voluminous information is provided to a user in return for a search query, thereby making the user spend time towards understanding the retrieved information set and identifying the relevant information from the retrieved information set. Further, World Wide Web may not be able to provide customized search results to the users given its limitations in accurately analyzing user interests and user knowledge.

In yet another strategy, consumers were asked for their preferences at the time of information retrieval or through settings. Such systems are limited by the capability for users to define their preferences and need for user to customize each of the services that he accesses.

At present third party service providers furnishes data to users on the respective portals based on last user logged in details, interests and queries. There is no method and system for the service providers to collate the personalized details of the users from the various community portals, web sites and social media networks to provide a more appropriate and user interested and required details at run time and on the fly after the logging in of a user to a third party service provider.

Therefore, to obviate the aforementioned shortcomings, the capabilities of content processing and information retrieval were combined together to develop the phenomenon of image search. The phenomenon of image search involves capturing the image of an object and searching for the information corresponding to the object, based on the image of the object. However, such image based searching techniques are gaining popularity in recent years, and leave much to be desired in terms of the relevance of the search results and the information retrieved and provided during the search exercises.

Hence there is a need for a system and method for rendering the multimedia information retrieval and search in a more effective and efficient manner. Further there is a need for a system and method to provide all personalized data gathered from a plurality of community portals, web sites and social media networks to a third party service provider to provide a more appropriate and user interested and required details at run time and on the fly after the logging in of a user to the third party service provider.

The shortcomings of the prior art, the solutions proposed by the embodiments herein, and the manner in which these solutions are brought about will be better understood by reading the following description.

OBJECTS OF THE EMBODIMENTS

The primary object of the embodiments herein is to provide a system and method for providing the multimedia and parameter (image, sound, location and text) based searching.

Another object of the embodiments herein is to provide a system and method for envisaging improved image, sound, location and text processing capabilities.

Yet another object of the embodiments herein is to provide a system and method envisaging improved search capabilities.

Yet another object of the embodiments herein is to provide a system and method that employ efficient and effective multi-input processing techniques to identify a suitable input defining user interest.

Yet another object of the embodiments herein is to provide a system and method that envisage identification of keywords and information based on the inputs provided by the user in respect of previously provided search results.

Yet another object of the embodiments herein is to provide a system and method that indexes these keywords against secure personal credentials and access tokens.

Yet another object of the embodiments herein is to identify the tokens presented by external systems to authenticate the request and deliver personalization keywords and values.

Yet another object of the embodiments herein is to collate, store and forward the personalized details and interest of the users collected from the various community portals, web sites and social media networks to the third party service providers to provide a more appropriate and user interested and required details at run time and on the fly after the logging in of a user to a third party service provider.

Yet another object of the embodiments herein is to collate, store and forward the personalized details and interest of the users collected from the various community portals, web sites and social media networks to the merchant establishments and online merchant portals to provide a more appropriate and user interested and required details at run time and on the fly after the logging in of a user to the merchant establishments or online merchant portals or e-commerce sites.

These and other objects and advantages of the embodiments herein will be apparent from the reading of the detailed description in conjunction with the drawings.

SUMMARY

According to one embodiment herein, a computer implemented system for identifying offline consumer interests for online personalization by leveraging multimedia inputs is disclosed. The system comprises a handheld device accessible to the user and configured to capture at least multimedia content. The handheld device enables the user to define the criteria for handling the captured multimedia content.

The system further comprises a processor cooperating with the handheld device and configured to process the multimedia content captured by the handheld device using the predetermined processing directives. The processor further extracts at least one keyword from the processed multimedia content.

The system further comprises an indexing module that captures the keywords from the presentation and associates the keywords against the user credentials. The indexing module is further configured to create access tokens associated with the user credentials to ensure a security of such information being stored while being accessed by the third party systems.

The system further comprises a learning module configured to recognize the multimedia inputs and identify new keywords. The learning module is configured to adapt the identified new keywords to all previous and new inputs being shared with the system.

The system indexes the extracted keywords against a particular user attributes and defines the access token systems. The access tokens and the user attributes can be used by any service to which user is registered to, for querying the system being defined for the user preferences. Such external systems would only be able to query the system being defined based on the authentication by the user while using external systems.

According to one embodiment herein, the customizing module transmits the preferences/customized information based on the user credentials and access token to external services via the communication network thereby providing the user with accessibility to the customized information.

According to one embodiment herein, the handheld device is configured to enable the user to define the criteria for handling the captured multimedia content, and wherein the criteria comprises the preferences of the user in terms of the information to be searched and retrieved, the data stores to be searched, the manner in which the results are to be displayed, relevance factor of the retrieved results, and the order of arrangement of the retrieved search results.

According to one embodiment herein, the processor is further configured to extract the keyword(s) indicative of the location of the handheld device. The processor further extracts the keyword(s) indicative of the information required by the user. The processor analyzes the requirement for the information based on the multimedia contents captured by the handheld device.

According to one embodiment herein, the customizing module is configured to refine the customized information presented to the user. The customizing module refines the customized information based on at least the selection of a part of the customized information by the user, a query specified by the user via the handheld device, a service/product subscribed by the user via the handheld device, and combinations thereof.

According to one embodiment herein, the customizing module is configured is to collate, store and forward the personalized details and interest of the users collected from the various community portals, web sites and social media networks to the third party service providers to provide a more appropriate and user interested and required details at run time and on the fly after the logging in of a user to a third party service provider.

According to one embodiment herein, the customizing module is configured to collate and customize the user preference details and interests from the plurality of community portals, web sites and social media networks to the merchant establishments and online merchant portals to provide a more appropriate and user interested and required details at run time and on the fly after the logging in of a user to the merchant establishments or online merchant portals or e-commerce sites.

According to one embodiment herein, a third party service provider logs-in and accesses the customizing module in a central server to retrieve a customized profile of a user to retrieve the latest and updated preference details and interests of the user to provide an updated details with respect to the logged in user, when a user accesses and logs-in into the third party service provider.

According to one embodiment herein, a merchant establishment or an online merchant portal or an e-commerce portal logs-in and accesses the customizing module in a central server to retrieve a customized profile of a user to retrieve the latest and updated preference details and interests of the user to provide an updated details with respect to the logged in user, when a user accesses and logs-in into a merchant establishment or an online merchant portal or an e-commerce portal.

According to one embodiment herein, a computer implemented method is provided for identifying the offline consumer interests for online personalization by leveraging multimedia inputs. The method, in accordance with the embodiments herein, comprises the following steps: capturing at least one multimedia content via a handheld device accessible to the user, and enabling the user to define the criteria for handling the captured multimedia content; processing the captured multimedia content using the predetermined processing directives, and extracting at least one keyword from the processed multimedia content; receiving the extracted keyword(s) and searching at least one predetermined data store for information comprising the extracted keyword(s); retrieving the information comprising the extracted keywords(s); generating a profile for the user; dynamically customizing the information based on the keywords generated by the processor and search results; indexing the profile of the user against set of personal id's, access token and authentication parameters from which information would be requested for retrieval; and dynamically refining the customized information presented to the user, in the event any of the external third party services requests for preferences of the users.

According to one embodiment herein, the step of enabling the user to define the criteria for handling the captured multimedia content, further includes the step of enabling the user to define the preferences in terms of at least the information to be searched and retrieved, the data stores to be searched, the manner in which the results are to be displayed, relevance factor of the retrieved results, and the order of arrangement of retrieved search results.

According to one embodiment herein, the step of extracting at least one keyword from the processed multimedia content further includes the steps of extracting the keyword(s) indicative of the location of the handheld device, extracting the keyword(s) indicative of the information required by the user, and analyzing the requirement for the information based on the multimedia content captured by the handheld device.

According to one embodiment herein, the step of dynamically refining the customized information presented to the user further includes the step of refining the customized information based on the selection of at least a part of the customized information by the user, a query specified by the user via the handheld device, a service/product subscribed by the user via the handheld device, and combinations thereof.

According to one embodiment herein, the method further comprises collating, storing and forwarding the personalized details and interest of the users collected from the various community portals, web sites and social media networks to the third party service providers to provide a more appropriate and user interested and required details at run time and on the fly after the logging in of a user to a third party service provider.

According to one embodiment herein, the method further comprises collating and customizing the user preference details and interests from the plurality of community portals, web sites and social media networks to the merchant establishments and online merchant portals to provide a more appropriate and user interested and required details at run time and on the fly after the logging in of a user to the merchant establishments or online merchant portals or e-commerce sites.

According to one embodiment herein, the method further comprises accessing a customizing module in the central server by a third party service provider after a log-in process to retrieve a customized profile of a user to retrieve the latest and updated preference details and interests of the user to provide an updated details with respect to the logged in user, when a user accesses and logs-in into the third party service provider.

According to one embodiment herein, the method further comprises accessing a customizing module in the central server by a merchant establishment or an online merchant portal or an e-commerce portal after a log-in to retrieve a customized profile of a user to retrieve the latest and updated preference details and interests of the user to provide an updated details with respect to the logged in user, when a user accesses and logs-in into a merchant establishment or an online merchant portal or an e-commerce portal.

According to one embodiment herein, a non transitory computer readable medium having computer readable instructions stored thereupon is provided. The computer readable instructions when executed by a processor, are configured to cause a computer enabled device to: capture at least multimedia content via a handheld device accessible to the user, and enable the user to define the criteria for handling the captured multimedia content; process the captured multimedia content using predetermined processing directives, and extract at least one keyword from the processed multimedia content; receive the extracted keyword(s) and search at least one predetermined data store for information comprising the extracted keyword(s); retrieve the information comprising the extracted keywords(s); generate a profile for the user; dynamically customize the information based on the keywords generated by the processor and search results, index the profile of the user against set of personal id's, access token and authentication parameters from which information would be requested for retrieval; and dynamically refine the customized information presented to the user, in the event any of the external third party services requests for preferences of the users.

According to one embodiment herein, the computer readable instructions, when executed by a processor are further configured to cause a computer based device to enable the user to define the preferences in terms of at least the information to be searched and retrieved, the data stores to be searched, the manner in which the results are to be displayed, relevance factor of the retrieved results, and the order of arrangement of retrieved search results.

According to one embodiment herein, the computer readable instructions, when executed by a processor are further configured to enable a computer enabled device to: extract the keyword(s) indicative of the location of the handheld device; extract the keyword(s) indicative of the information required by the user; analyze the requirement for the information based on the multimedia content captured by the handheld device; and refine the customized information based on at least the selection of a part of the customized information by the user, a query specified by the user via the handheld device, a service/product subscribed by the user via the handheld device, and combinations thereof.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the description of the embodiments herein and the accompanying drawings in which.

Figure 1:
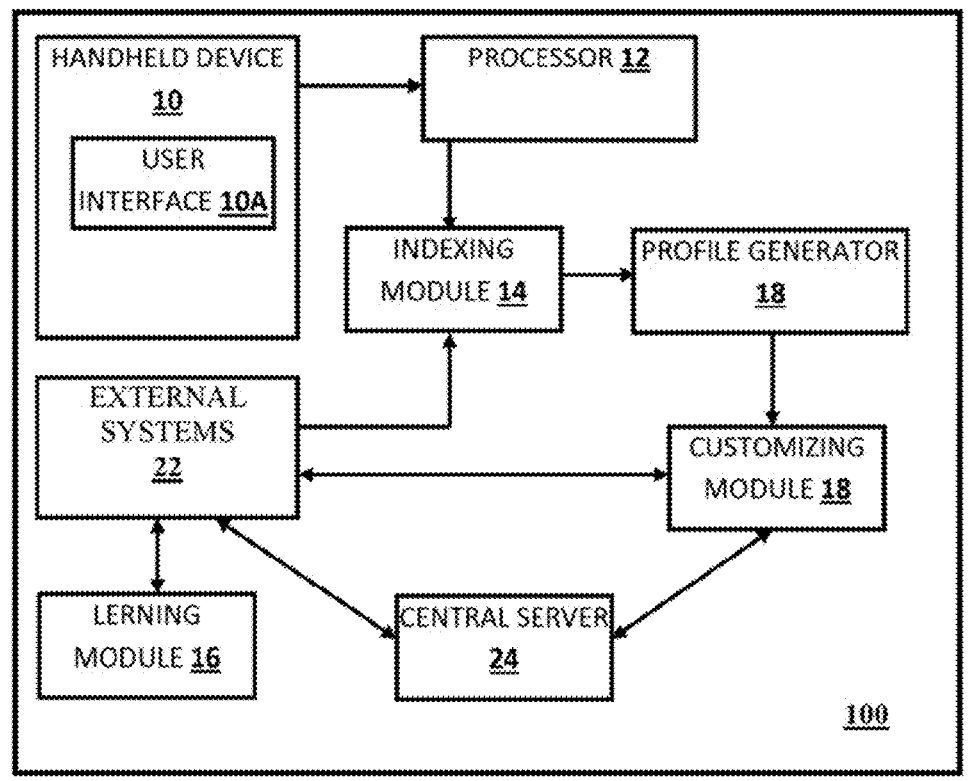
FIG. 1 Illustrates a system level block diagram of a computer implemented system for identifying offline consumer interests for online personalization by leveraging multimedia input according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

On the outset, the embodiments herein envisage a computer implemented system for enabling a user to retrieve information from a communication network. The system envisaged by the embodiments herein enables a user to provide multimedia inputs, typically images, in addition to textual input (in the form of search strings), which would be decoded and used by the system for searching and retrieving corresponding relevant information. Further, it is also within the scope of the embodiments herein to combine in one step, the textual input and the multimedia image input, and conduct a search, and retrieve the relevant information. Further, it is also within the scope of the embodiments herein to conduct a search based on other forms of multimedia inputs including but not restricted to voice based inputs, video based inputs. However, the functionalities of the system have been explained with reference to images as the preferable multimedia inputs, and therefore the explanation should not be deemed as restrictive, and should be construed as equally applicable to all the possible replacement inputs, such as voice inputs and video based inputs.

The system, according to one embodiment herein, makes use of a handheld device, typically, a camera enabled mobile phone, to receive multimedia inputs. By enabling a user to provide multimedia inputs, the system provides for the user to capture an image of the object of interest, rather than having been obligated to remember and timely recollect the characteristics/specifications of an object of interest in order to initiate a search. Further, the system envisaged by the embodiments herein refines the retrieved information based on a predetermined criteria specified by the user, prior to presenting the same to the user. The system of the embodiments herein presents to the user the customized information, rather than merely extracting the available information from the world web. Further, the system of the embodiments herein provides for drill-down opportunities in respect of the retrieved information, i.e., the information retrieved by the system can be used as the input to drill down to the minute details to towards a broader information set, as per the inputs specified by the user.

Referring to the accompanying drawings, FIG. 1 illustrates a system level block diagram illustrating the components of the system 100 for enabling the user to retrieve information from a communication network. The system 100, in accordance with the embodiments herein comprises a handheld device 10 accessible to a user. The handheld device 10 can be a camera enabled mobile phone or a camera enabled smart phone or Tablet PC with image capturing capabilities or any device having image capturing capabilities. The handheld device 10 enables the user to inter alia, capture the image of an object of interest. An object of interest could be for example, a book, a decorative article, a dish and the like. Further, the handheld device 10 also enables the user to specify the manner in which the captured multimedia input should be handled and his preferences/choices. For example, the handheld allows the user to specify, through a user interface 10A, the data stores/repositories to be searched, the search engine to be utilized for searching, the number of search results to be displayed per webpage, the order in which the search results are to be sorted (whether to be sorted based on the relevance factor or not, whether to be sorted based on date of creation or not) and the font and language of display of search results.

The system 100, according to one embodiment herein, comprises a processor 12. However, the processor 12 can be external to, and communicably coupled to the handheld device 10. The processor 12 is configured to process the multimedia content, typically images, captured by the handheld device 10. The processor 12, in accordance with the present discourse, firstly identifies the object (of interest) captured (as an image) by the handheld device 10, using pre-determined image processing techniques. Subsequent to the identification of the object present in the image, the processor 12 identifies at least one keyword corresponding to the identified object. In accordance with the embodiments herein, the processor 12 can be provided with access to a table comprising a plurality of images being mapped to a plurality of keywords identifying the respective images. It is also possible that the processor 12 conducts a preliminary search across predetermined data store(s) to identify the keywords corresponding to the identified image. In accordance with the embodiments herein, the processor 12 processes, i.e., typically decodes the captured multimedia input using predetermined processor directives. The processor directives are typically computer implemented instructions which enable the processor 12 to decode the captured multimedia input.

The system further comprises an indexing module 14 connected to a central server to capture the keywords from the presentation and associates the keywords against the user credentials. The indexing module 14 is further configured to create access tokens associated with the user credentials to ensure security of such information being stored while being accessed by the third party systems. The indexing module 14 indexes the extracted keywords against the particular user attributes and defines access token systems. Access tokens and user attributes can be used by any service to which user is registered to, for querying the system being defined for user preferences. Such external systems 22 would only be able to query the system being defined based on the authentication by the user while using external systems 22.

The system further comprises a learning module 16 configured to recognize multimedia inputs and identify new keywords. The learning module is configured to adapt the identified new keywords to all previous and new inputs being shared with the system.

According to one embodiment herein, the system 100 further comprises a customizing module 18 which, based on the user credentials and access token, transmits the preferences/customized information, to external services via the communication network thereby providing the user with accessibility to the customized information.

According to one embodiment herein, the user of the handheld device 10 is associated with a user profile which describes the preferences (including likes, tastes and dislikes) of the user. The system 100 includes a profile generator 20 configured to generate a profile for each of the users of the handheld device 10. The user profile is accessible via standard procedures including furnishing of a user-id and password. The profile generator 20 populates the profile of the user with at least the information corresponding to the multimedia content captured (previously) by the user, via the handheld device 10, and the corresponding keywords generated by the processor 12. Further, the user profile (created by the profile generator 20) can be linked to the other social networking profiles (such as the Facebook™, LinkedIn™) of the user thereby preferably integrating the contents of the aforementioned social networking profiles, i.e., Facebook™, LinkedIn™ profiles, with the user profile generated by the profile generator 20.

Further, the profile generator 20 is configured to dynamically update the user profile at least partially depending upon the multimedia content captured by the user and the keywords generated by the processor 12 in respect of the captured multimedia content. Further since the user profile is linked to the user's other social networking profiles, the preferences of the user are preferably seamlessly transferred and made available across all the social networking profiles of the user. Further, for example, if the user logs onto a online shopping portal (for example Amazon™) using his/her Facebook™ profile or LinkedIn™ authentication credentials, the customizing module 18 of the embodiments herein selectively accesses the user profile (generated by profile generator 20), since the user profile is linked to both the Facebook™ profile and LinkedIn™ profiles of the user, and subsequently pushes the relevant information (the customizing module 18 determines the relevancy of the information based on the preferences available in the user profile, and selectively customizes the available information to suit the preferences of the user) onto the Amazon™ portal (represented as an external system 22 in FIG. 1), in any of the well known formats.

The customizing module 18 is configured to customize the search results in accordance with preferably the profile (generated by the profile generator 18) of the user. However, it is also possible that the information being presented to the user is customized based on a predetermined customization criteria including but not restricted to the format in which the search results are to be displayed, the number of search results to be displayed per web page, and font of the display of search results and the like. Further, the customization criteria for the retrieved search results can be specified by the user via the handheld device 10.

According to one embodiment herein, the customizing module 18 transmits the customized information to the handheld device 10, in order to enable the user to view and access the search results. Further, on accessing the results, the user is enabled to request for further information, i.e. detailed information, on the information that had been previously displayed to him. In such an event, a run time request, i.e. a dynamic request is generated at the handheld device 10, and the processor 12 processes the dynamic request and subsequently generates keywords corresponding to the dynamic request.

According to one embodiment herein the dynamic request generated by the user can include a keyword/key string, a selection of a particular word from previously displayed search result, a navigation to a particular search result, selection of a particular word from the previously displayed search result, a query specified by the user via the handheld device 10, a service/product subscribed by the user via the handheld device 10, and combinations thereof.

According to one embodiment herein, the customizing module connected to a central server 24 is configured is to collate, store and forward the personalized details and interest of the users collected from the various community portals, web sites and social media networks to the third party service providers to provide a more appropriate and user interested and required details at run time and on the fly after the logging in of a user to a third party service provider.

According to one embodiment herein, the customizing module is configured to collate and customize the user preference details and interests from the plurality of community portals, web sites and social media networks to the merchant establishments and online merchant portals to provide a more appropriate and user interested and required details at run time and on the fly after the logging in of a user to the merchant establishments or online merchant portals or e-commerce sites.

According to one embodiment herein, a third party service provider logs-in and accesses the customizing module in a central server to retrieve a customized profile of a user to retrieve the latest and updated preference details and interests of the user to provide an updated details with respect to the logged in user, when a user accesses and logs-in into the third party service provider.

According to one embodiment herein, a merchant establishment or an online merchant portal or an e-commerce portal logs-in and accesses the customizing module in a central server to retrieve a customized profile of a user to retrieve the latest and updated preference details and interests of the user to provide an updated details with respect to the logged in user, when a user accesses and logs-in into a merchant establishment or an online merchant portal or an e-commerce portal.

Figure 2:
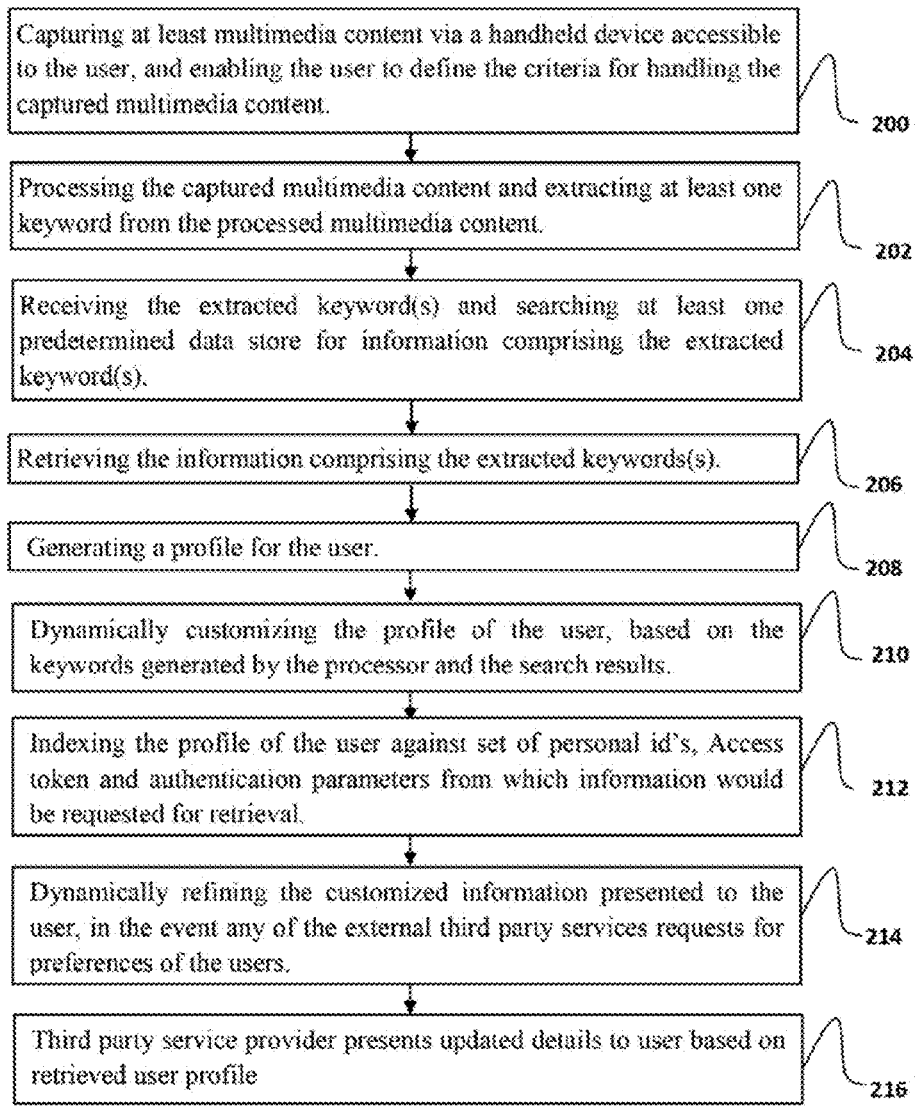
FIG. 2 illustrates a flowchart comprising the steps involved in the method for identifying offline consumer interests for online personalization by leveraging multimedia inputs according to one embodiment herein.

Referring to FIG. 2, there is shown a flowchart illustrating the steps involved in the method for identifying offline consumer interests for online personalization by leveraging multimedia inputs. The method, in accordance with the embodiments herein includes the following steps: capturing at least multimedia content via a handheld device accessible to the user, and enabling the user to define the criteria for handling the captured multimedia content (200); processing the captured multimedia content using predetermined processing directives, and extracting at least one keyword from the processed multimedia content (202); receiving the extracted keyword(s) and searching at least one predetermined data store for information comprising the extracted keyword(s) (204); Retrieving the information comprising the extracted keywords(s) (206); generating a profile for the user (208); dynamically customizing the information based on the keywords generated by the processor and search results (210); indexing the profile of the user against set of personal id's, Access token and authentication parameters from which information would be requested for retrieval (212); and dynamically refining the customized information presented to the user, in the event any of the external third party services requests for preferences of the users (214). The third party service provider accesses the customizing module in the central server to retrieve the updated and latest personal profiles and the interests of the user to provide the user with updated and latest details, when a user accesses the third party service provider (216).

According to one embodiment herein, the step of enabling the user to define the criteria for handling the captured multimedia content, further includes the step of enabling the user to define the preferences in terms of at least the information to be searched and retrieved, the data stores to be searched, the manner in which the results are to be displayed, relevance factor of the retrieved results, and the order of arrangement of retrieved search results.

According to one embodiment herein, the step of extracting at least one keyword from the processed multimedia content further includes the steps of extracting the keyword(s) indicative of the location of the handheld device, extracting the keyword(s) indicative of the information required by the user, and analyzing the requirement for the information based on the multimedia content captured by the handheld device.

According to one embodiment herein, the step of dynamically refining the customized information presented to the user further includes the step of refining the customized information based on at least the selection of a part of the customized information by the user, a query specified by the user via the handheld device, a service/product subscribed by the user via the handheld device, and combinations thereof.

According to one embodiment herein, the method further comprises the following computer implemented steps: generating a profile for the user, the profile comprising the preferences of the user, the preferences being generated by a profile generator based on at least the multimedia content captured by the user, the keywords elicited by the captured multimedia content, and the search results provided by the search module; and dynamically customizing the profile of the user, based on the keywords generated by the processor and the search results provided by the search module.

According to one embodiment herein, the step of customizing the retrieved information based on at least a predefined customization criterion, further includes the step of customizing the information to be presented to the user, at least partially based on the profile of the user.

According to one embodiment herein, the method further comprises collating, storing and forwarding the personalized details and interest of the users collected from the various community portals, web sites and social media networks to the third party service providers to provide a more appropriate and user interested and required details at run time and on the fly after the logging in of a user to a third party service provider.

According to one embodiment herein, the method further comprises collating and customizing the user preference details and interests from the plurality of community portals, web sites and social media networks to the merchant establishments and online merchant portals to provide a more appropriate and user interested and required details at run time and on the fly after the logging in of a user to the merchant establishments or online merchant portals or e-commerce sites.

According to one embodiment herein, the method further comprises accessing a customizing module in the central server by a third party service provider after a log-in process to retrieve a customized profile of a user to retrieve the latest and updated preference details and interests of the user to provide an updated details with respect to the logged in user, when a user accesses and logs-in into the third party service provider.

According to one embodiment herein, the method further comprises accessing a customizing module in the central server by a merchant establishment or an online merchant portal or an e-commerce portal after a log-in to retrieve a customized profile of a user to retrieve the latest and updated preference details and interests of the user to provide an updated details with respect to the logged in user, when a user accesses and logs-in into a merchant establishment or an online merchant portal or an e-commerce portal.

According to one embodiment herein, a non transitory computer readable medium has been disclosed. The non transitory computer readable medium stores computer readable instructions, which when executed by a processor, are configured to cause a computer enabled device to: capture at least multimedia content via a handheld device accessible to the user, and enable the user to define the criteria for handling the captured multimedia content; process the captured multimedia content using predetermined processing directives, and extract at least one keyword from the processed multimedia content; receive the extracted keyword(s) and search at least one predetermined data store for information comprising the extracted keyword(s); Retrieve the information comprising the extracted keywords(s); generate a profile for the user; dynamically customize the information based on the keywords generated by the processor and search results; index the profile of the user against set of personal id's, Access token and authentication parameters from which information would be requested for retrieval; and dynamically refine the customized information presented to the user, in the event any of the external third party services requests for preferences of the users. In accordance with the embodiments herein, the computer readable instructions, when executed by a processor are further configured to cause a computer based device to enable the user to define the preferences in terms of at least the information to be searched and retrieved, the data stores to be searched, the manner in which the results are to be displayed, relevance factor of the retrieved results, and the order of arrangement of retrieved search results.

According to one embodiment herein, the computer readable instructions, when executed by a processor are further configured to enable a computer enabled device to: extract the keyword(s) indicative of the location of the handheld device; extract the keyword(s) indicative of the information required by the user; analyze the requirement for the information based on the multimedia content captured by the handheld device; and refine the customized information based on at least the selection of a part of the customized information by the user, a query specified by the user via the handheld device, a service/product subscribed by the user via the handheld device, and combinations thereof.

According to one embodiment herein, the computer readable instructions, when executed by a processor are further configured to cause a computer based device to: generate a profile for the user, the profile comprising the preferences of the user, the preferences being generated by a profile generator based on at least the multimedia content captured by the user, the keywords elicited by the captured multimedia content, and the search results provided by the search module, dynamically customize the profile of the user, based on the keywords generated by the processor and the search results provided by the search module; and dynamically customize the information to be presented to the user, at least partially based on the profile of the user.

The technical advantages envisaged by the embodiments herein include the realization of a computer implemented system and method for identifying offline consumer interests for online personalization by leveraging multimedia inputs. The system and method envisaged by the embodiments herein enables the user to capture the image of an object of interest via a handheld device, preferably a camera enabled mobile phone. The system and method envisaged by the embodiments herein include advanced image processing capabilities, based on which the image captured by the user is accurately analyzed/processed. The system and method envisaged by the embodiments herein provide customized information to the user based on the processing of the multimedia content captured by the user. The system and method envisaged by the embodiments herein dynamically refines the information being provided to the user based on the criteria specified by the user.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A computer implemented system for identifying offline consumer interests for online personalization by leveraging multimedia inputs, said system comprising:

a handled device accessible to a user, and wherein said handheld device is configured to capture at least multimedia content, and wherein said handheld device is further configured to enable the user to define a criteria for handling the captured multimedia content;

a processor cooperating with the handheld device, and wherein said processor is configured to process the multimedia content captured by the handheld device using predetermined processing directives, and wherein said processor s further configured to extract at least one keyword from the processed multimedia content;

an indexing module that captures the keywords from a presentation and associates the keyword against user credentials, and wherein said indexing is further configured to create access tokens associated with the user credentials to ensure security of information being stored while being accessed by the third party systems, and wherein the indexing module is further configured to index the extracted keyword against particular user attributes to define the access tokens, and wherein the access tokens and the user attributes are used by any service for querying;

a learning module configured to recognize multimedia inputs and identify new keywords, and wherein said learning module is configured to adapt the identified new keywords to all previous and new inputs being shared;

a profile generator configured to generate a profile for the user, and wherein said profile comprises preferences of the user, and wherein said preferences are generated by the profile generator based on at least the multimedia content captured by the user, the keyword elicited by the captured multimedia content, and a search provided by a search module, and wherein said profile generator is further configured to dynamically modify the profile of the user, at least based on the keyword extracted by the processor and the search result provided by the search module, and wherein the profile generator is configured to link generated user profile with a plurality of social networking profiles of the user thereby integrating the generated user profile with a user profile in a plurality of social networks;

a customized module cooperating with the search module and the profile generator, and wherein said customizing module is configured to customize information required by the user based on at least the profile of the user, and wherein said customizing module is still further to configured to dynamically refine a customized information to be presented to the user, in the event the user requests via the handheld device, for further information, and wherein said hand held device is configured to generate a dynamic request or a runtime request for further information on information that is already displayed, after accessing the search results, and wherein the processor is configured to process the dynamic request to generate keywords corresponding the dynamic request, and wherein the dynamic request comprises any one of a keyword/key string, a selection of a particular word from a previously displayed search result, a navigation to a particular search result, a query specified by the user through the hand held device, a service/product subscribed by the user through the hand held device, and a combination thereof, and wherein the customizing module is configured to determine a relevancy of information based on preferences available in the user profile to customize available information to suit the preferences of user to push a relevant information to a social networking portal;

a central server provides a customized user profile to a third party service provider to enable the third party service provider to provide an updated and latest details to a log-in user based on retrieved updated profile comprising interests and preferences of the logged-in user, and wherein the customizing module is configured to be connected with a central server to collate, store and forward personal details and interest of the user collected from a plurality of community portals, websites, and social media networks to a plurality of third party service providers or merchant establishments and online merchant portals to provide a user interested and required details at run time and on fly after a logging-in of the user;

wherein the processor is further configured to extract keyword(s) indicative of a location of the handheld device, said processor further configured to extract keyword(s) indicative of the information required by the user, and wherein said processor is still further configured to analyze a requirement for the information based on the multimedia content captured by the handheld device, and wherein the handheld device is configured to enable the user to define the criteria for handling the captured multimedia content, wherein the criteria comprises preferences of the user in terms of information to be searched and retrieved, data stores to be searched, a search engine to be utilized for searching, a manner in which the search results are to be displayed, a relevance factor of retrieved search results, an order of arrangement of the retrieved search results, and a font and language of display of the search results, and wherein the order of arrangements of the retrieved search results includes sorting of the retrieved search results based on the relevance factor, or sorting of the retrieved search results based on date of creation, and wherein the customizing module is configured to refine the customized information to be presented to the user, said customizing module is configured to refine the customized information based on at least a selection of a part of the customized information by the user, a query specified by the user via the handheld device, a service/product subscribed by the user via the handheld device, and combinations thereof.

2. The system as claimed in claim 1, wherein said customizing module is further configured to transmit the customized information to the handheld device via a communication network thereby providing the user with accessibility to the customized information.

3. A computer implemented method for identifying offline consumer interests for online personalization by leveraging multimedia inputs, said method comprising the following steps:
   capturing at least multimedia content via a handheld device accessible to a user, and enabling the user to define a criteria for handling the captured multimedia content;
   processing the captured multimedia content using predetermined processing directives, and extracting at least one keyword from the processed multimedia content, and wherein the step of extracting at least one keyword from the processed multimedia content further includes the steps of extracting keyword(s) indicative of an information required by the user, and analyzing a requirement for the information based on the multimedia content captured by the handheld device;
   receiving the extracted keyword(s), and searching at least one predetermined data store for information comprising the extracted keyword(s);
   retrieving an information comprising the extracted keyword(s);
   generating a profile for the user, and wherein said profile comprises preferences of the user, and wherein said preferences are generated based on at least the multimedia content captured by the user, the keyword(s) corresponding to the captured multimedia content, wherein the generated user profile is linked with a plurality of social networking profiles of the user thereby integrating the generated user profile with a user profile in a plurality of social networks;
   dynamically customizing the profile of the user, based on the keyword(s) extracted by the processor and search results provided by a search module;
   indexing the profile of the user against a set of personal identifications, access token and authentication parameters from which information is requested for retrieval, and wherein an extracted keyword is indexed with an indexing module against particular user attributes to define the access tokens, and wherein the access tokens and the user attributes are used by any service for querying;
   determining a relevancy of information based on preferences available in the user profile to customize available information to suit the preferences of user to push a relevant information to a social networking portal;
   generating a dynamic request or a runtime request for further information on information that is already displayed, after accessing the search results, and wherein the processor is configured to process the dynamic request to generate keywords corresponding the dynamic request, and wherein the dynamic request comprises any one of a keyword/key string, a selection of a particular word from a previously displayed search result, a navigation to a particular search result, a query specified by the user through the hand held device, a service/product subscribed by the user through the hand held device, and a combination thereof;
   dynamically refining a customized information to be presented to the user, in the event any one of external third party services requests for preferences of the users;
   connecting a customizing module with a central server to collate, store and forward personal details and interest of the user collected from a plurality of community portals, websites, and social media networks to a plurality of third party service providers or merchant establishments and online merchant portals to provide a user interested and required details at run time and on fly after a logging-in of the user; and
   providing updated details to a logged-in user by a third party service provider based on updated profile comprising updated personal preferences and interests of the logged-in user.

4. The method as claimed in claim 3, wherein the step of enabling the user to define the criteria for handling the captured multimedia content, further includes the step of enabling the user to define the preferences in terms of at least information to be searched and retrieved, data stores to be searched, a search engine to be utilized for searching, a manner in which the search results are to be displayed, relevance factor of retrieved search results, an order of arrangement of the retrieved search results and a font and language of display of the search results, and wherein the order of arrangements of the retrieved search results includes sorting of the retrieved search results based on the relevance factor, or sorting of the retrieved search results based on date of creation.

5. The method as claimed 3, wherein the step of dynamically refining the customized information presented to the user further includes the steps of refining the customized information presented to the user further includes the step of refining the customized information based on at least a selection of part of the customized information by the user, a query specified by the user via the handheld device, a service/product subscribed by the user via the handheld device, and combinations thereof.

6. A non-transitory computer readable medium having computer readable instructions stored thereupon, said readable instructions when executed by a processor, are configured to cause a computer enabled device to:
   capture at least multimedia content via a handheld device accessible to the user, and enable the user to define a criteria for handling the captured multimedia content;
   process the captured multimedia content using predetermined processing directives, and extract at least one keyword from the processed multimedia content;
   receive the extracted keyword at a search module, and search at least one predetermined data store for information comprising the extracted keyword, and wherein the search is based at least partially on the criteria defined by the user,
   retrieve information comprising the extracted keyword;
   generating a profile for the user, and wherein said profile comprising preferences of the user, and wherein said preferences are generated based on at least the multimedia content captured by the user, keyword(s) corresponding to the captured multimedia content, wherein the generated user profile is linked with a plurality of social networking profiles of the user thereby integrating the generated user profile with a user profile in a plurality of social networks;
   dynamically customized the profile of the user, based on the keyword extracted by a processor and search results provided by a search module;
   indexing the profile of the user against a set of personal identifications, access token and authentication parameters from which information is requested for retrieval, and wherein an extracted keyword is indexed with an indexing module against particular user attributes to define the access token, and wherein the access token and the user attributes are used by any service for querying;

determining a relevancy of information based on preferences available in the user profile to customize available information to suit the preferences of user to push a relevant information to a social networking portal;

generating a dynamic request or a runtime request for further information on information that is already displayed, after accessing the search results, and wherein the processor is configured to process the dynamic request to generate keywords corresponding the dynamic request, and wherein the dynamic request comprises any one of a keyword/key string, a selection of a particular word from a previously displayed search result, a navigation to a particular search result, a query specified by the user through the hand held device, a service/product subscribed by the user through the hand held device, and a combination thereof;

connecting a customizing module with a central server to collate, store and forward personal details and interest of the user collected from a plurality of community portals, websites, and social media networks to a plurality of third party service providers or merchant establishments and online merchant portals to provide a user interested and required details at run time and on fly after a logging-in of the user;

dynamically refining a customized information presented to the user, in the event any one of external third party services requests for preferences of the users;

extract keyword(s) indicative of a location of the handheld device;

extract keyword(s) indicative of an information required by the user;

analyze a requirement for the information based on the multimedia content captured by the handheld device; and refine the customized information based on at least a selection of a part of the customized information by the user, a query specified by the user via the handheld device, a service/product subscribed by the user, and combinations thereof.

7. The non-transitory computer readable medium as claimed in claim 6, wherein the computer readable instructions, when executed by a processor are further configured to cause a computer based device to enable the user to define the preferences in terms of at least an information to be searched and retrieved, data stores to be searched, a search engine to be utilized for searching, a manner in which a search results are to be displayed, a relevance factor of retrieved search results, an order of arrangement of the retrieved search results, and a font and language of display of the search results, and wherein the order of arrangements of the retrieved search results includes sorting of the retrieved search results based on the relevance factor, or sorting of the retrieved search results based on date of creation.

8. The non-transitory computer readable medium as claimed in claim 6, wherein the computer readable instructions, when executed by a processor are further configured to cause a computer based device to:

generate a profile for the user, and wherein said profile comprises the preferences of the user, and wherein said preferences are generated based on at least the multimedia content captured by the user, keywords elicited by the captured multimedia content, and the search results provided by the search module;

dynamically customize the profile of the user, based on the keyword extracted by the processor and the search results provided by the search module; and dynamically customize the information presented to the user, at least partially based on the profile of the user.

* * * * *